(12) United States Patent
Greggain

(10) Patent No.: US 7,154,512 B2
(45) Date of Patent: Dec. 26, 2006

(54) SYSTEM AND METHOD FOR IMAGE WARPING

(75) Inventor: Lance Greggain, Woodbridge (CA)

(73) Assignee: Jaldi Semiconductor Corp., Richmond Hill (CA)

(\*) Notice: Subject to any disclaimer, the term of this patent is extended or adjusted under 35 U.S.C. 154(b) by 373 days.

(21) Appl. No.: 09/984,001

(22) Filed: Oct. 26, 2001

(65) Prior Publication Data

US 2003/0095136 A1   May 22, 2003

(51) Int. Cl.
| | |
|---|---|
| G09G 5/00 | (2006.01) |
| G06T 15/00 | (2006.01) |
| G06K 9/32 | (2006.01) |
| G06F 17/10 | (2006.01) |

(52) U.S. Cl. .................... 345/646; 345/419; 345/647; 382/298; 708/300

(58) Field of Classification Search ............... 708/300; 382/298; 345/419, 646–647
See application file for complete search history.

(56) References Cited

U.S. PATENT DOCUMENTS

| | | | | |
|---|---|---|---|---|
| 4,602,285 A | * | 7/1986 | Beaulier et al. ............ 348/580 |
| 4,805,129 A | * | 2/1989 | David ......................... 708/300 |
| 5,175,808 A | * | 12/1992 | Sayre ......................... 345/647 |
| 5,204,944 A | * | 4/1993 | Wolberg et al. ............ 345/247 |
| 5,440,653 A | * | 8/1995 | Greggain et al. ........... 382/298 |
| 5,594,676 A | * | 1/1997 | Greggain et al. ........... 708/300 |
| 5,977,947 A | * | 11/1999 | Potu ............................ 345/660 |
| 6,061,477 A | * | 5/2000 | Lohmeyer et al. ......... 382/300 |
| 6,188,803 B1 | * | 2/2001 | Iwase et al. ................ 382/300 |
| 6,384,828 B1 | * | 5/2002 | Arbeiter et al. .......... 345/472.2 |
| 6,460,127 B1 | * | 10/2002 | Akerib ........................ 712/10 |
| 6,573,889 B1 | * | 6/2003 | Georgiev .................... 345/419 |

OTHER PUBLICATIONS

Wolberg, George, "Digital Image Warping" IEE Computer Society Press, Los Alomos, California, 1990, Chapters 1, 4 and 5.

\* cited by examiner

*Primary Examiner*—Kee M. Tung
*Assistant Examiner*—Jin-Cheng Wang
(74) *Attorney, Agent, or Firm*—Marger Johnson & McCollom PC

(57) ABSTRACT

A system for generating a target pixel in a target grid from a plurality of source pixels in a source grid, said system comprising, a filter controller for determining a first distance between said target pixel and a source pixel to the left of said target pixel, and a second distance between said target pixel and a source pixel to the right of said target pixel; a left portion lookup circuit for determining filter coefficients for a left portion of said target pixel in accordance with said first difference; a right portion lookup circuit for determining filter coefficients for a right portion of said target pixel in accordance with said second difference; and a filter reconstruction unit for creating a filter in accordance with said left and right portion filter coefficients, said created filter for generating said target pixel from said plurality of source pixels.

12 Claims, 3 Drawing Sheets

10

SYSTEM AND METHOD FOR IMAGE WARPING

The present invention relates generally to digital signal processing, and more particularly to a system and method for image warping.

BACKGROUND OF THE INVENTION

Image warping, also know as 3-Dimensional (3-D) rendering or texture mapping, can be used to create a 3-D projection from an original 2-Dimensional (2-D) first image. Image warping is used to create visual effects in different visual media including film, television 3D graphics and computer displays. It can be expressed as the process of mapping pixels from a source sample grid to a target sample grid. Typically, the target grid is sampled at a different frequency than the source grid. In general, the output grid does not vary in a constant manner with respect to The input grid. The variations from pixel to pixel between the source grid and the target grid can make the process of image warping extremely complex.

Several systems and methods for image warping are known. Detailed discussions of prior art image warping and systems are discussed in Wolberg, George, "Separable Image Warping: Implications and Techniques", Phd. Thesis, Department of Computer Science, Columbia University, New York, 1990 and "Digital Image Warping", IEE Computer Society Press, Los Alomos, Calif., 1990. The prior art systems described in these documents are typically complicated and expensive to implement due to the large number of computations required.

U.S. Pat. No. 5,594,676 herein referred to as the '676 patent) titled "Digital Image Warping System", issued to Greggain et al discloses a particular prior art implementation for image warping. The '676 patent overcomes some of the problems of the prior art by using an intermediate grid, upsampled from the source grid, but having corresponding pixels to the target grid. In this manner, the source pixels are first mapped to the upsampled grid, and then readily mapped to the target grid.

Despite offering certain advantages over the prior art, the '676 patent still presents a relatively complicated solution because it requires an intermediate, upsampled grid. Upsampling requires extra circuitry and processing steps in order to achieve the desired digital image warping result. Furthermore, upsampling introduces distortion and can soften the image, which are often undesirable effects.

Therefore, it is an object of the present invention to obviate or mitigate at least some of the above mentioned disadvantages.

SUMMARY OF THE INVENTION

In accordance with an aspect of the present invention, there is provided a system for generating a target pixel in a target grid from a plurality of source pixels in a source grid. The system comprises a filter controller, a left portion lookup circuit, a right portion lookup circuit, a filter reconstruction unit, and a filter. The filter controller determines a first distance between the target pixel and a source pixel to the left of the target pixel, and a second distance between the target pixel and a source pixel to the right of the target pixel. The left portion lookup circuit determines filter coefficients for a left portion of the target pixel in accordance with the first difference. The right portion lookup circuit determines filter coefficients for a right portion of the target pixel in accordance with the second difference. The filter reconstruction unit creates a filter in accordance with the left and right portion filter coefficients for interpolating the target pixel from the plurality of source pixels. The filter performs the filtering operation according to the output of the filter reconstruction unit.

In accordance with a further aspect of the invention the left portion and the right portion of the filter are calculated separately without reconstructing the filter.

In accordance with another aspect of the invention, there is provided a method for generating a target pixel in a target grid from a plurality of source pixels in a source grid. The method comprises the following steps: A first distance between the target pixel and a source pixel to the left of said target pixel, and a second distance between the target pixel and a source pixel to the right of the target pixel are determined. A first set of filter coefficients for a left portion of the target pixel is determined in accordance with the first distance. A second set of filter coefficients for a right portion of the target pixel is determined in accordance with the second distance. The first and second sets of coefficients are combined for creating a final filter for the target pixel. The final filter is used for generating the target pixel.

BRIEF DESCRIPTION OF THE DRAWINGS

An embodiment of the present invention will now be described by way of example only with reference to the following drawings, in which.

DETAILED DESCRIPTION OF THE PREFERRED EMBODIMENT

The present invention relates to a method and system for image warping, also called texture mapping, which processes the pixels first horizontally and then vertically. The description of the preferred embodiments will be of the horizontal process only, however the vertical process is similar with the input data being scanned vertically instead of horizontally. Likewise, the process could be performed vertically first and horizontally second as desired. The invention allows for the design of filters that are asymmetric on either side of each output pixel by using filters that have been designed for asymmetry. The embodiments describe the method of design for the filters and a method for their use in image warping or texture mapping.

In one embodiment, the method selects filter coefficients for the left portion of the target output pixel by analyzing the distance in the input space between the target output pixel and the output pixel to the left of the target output pixel. The method then selects filter coefficients for the right portion of the target output pixel by the distance in the input space between the target output pixel and the output pixel to the right of the target output pixel. The filter coefficients are combined by simple addition and applied to The input data for producing the target pixel.

The filters used may be created from any poly-phase filter set using the simple technique for separating the filters into left and right portions. The filters may have an even number or an odd number of taps provided that both the left portion and right portion for any target pixel are selected from filters with an even number of taps or both selected from filters with an odd number of taps. The filter for the left portion of the target pixel may have a different frequency response and even a different number of taps than the filter used for the right portion of the target pixel.

Figure 1:
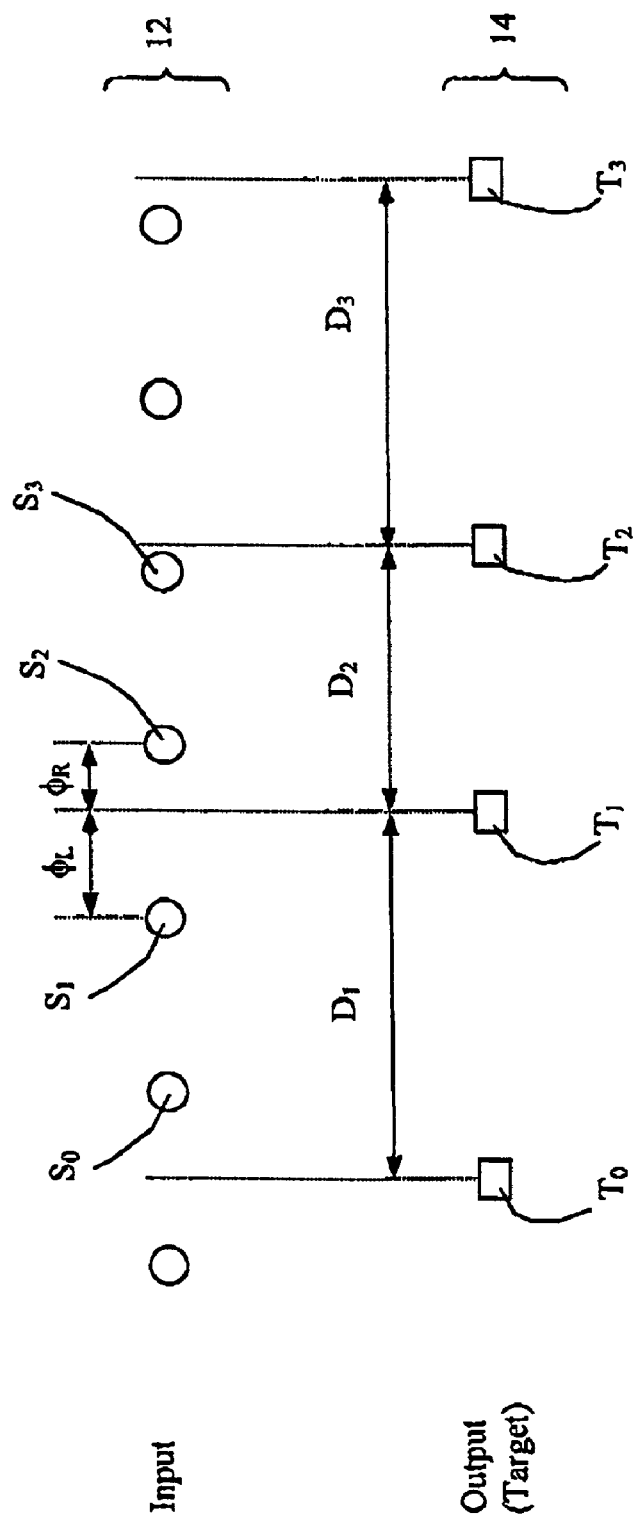
FIG. 1 is a schematic representation of a plurality of source pixels and a target pixel derived therefrom.

For convenience, like numerals in the description refer to like elements in the drawings. Referring to FIG. 1, an array of target pixels and source pixels is illustrated generally by numeral 10. A plurality of source pixels 12 are used for generating a plurality of target pixels 14. The position of the target pixels may be determined by any method that is known in the art, and thus will not be described in detail. Examples of such methods include accessing a file containing the locations of the output or target pixels; using a polynomial description of the location of the output pixels with respect to the input grid; and implementing a set of wire frames that approximates the surface of the object onto which the 2D image is to be projected.

The target pixels 14 are generated based on their spatial relationship with neighboring pixels as well as the source pixels 12. For example, a fist target pixel $T_0$ is separated by a horizontal distance $D_1$ from a second target pixel $T_1$, which is separated by a second horizontal distance $D_2$ from a third pixel $T_2$. A phase value $\phi_L$ is determined by the distance between the target pixel $T_1$ and a nearest input pixel $S_1$ to the left of target pixel $T_1$. Alternately, phase $\phi_R$ can be calculated as the distance between the target pixel $T_1$ and a source pixel $S_2$ that is the nearest input pixel to the right of the target $T_1$. Either calculation can be performed, since $\phi_R = 1 - \phi_L$.

Figure 2:
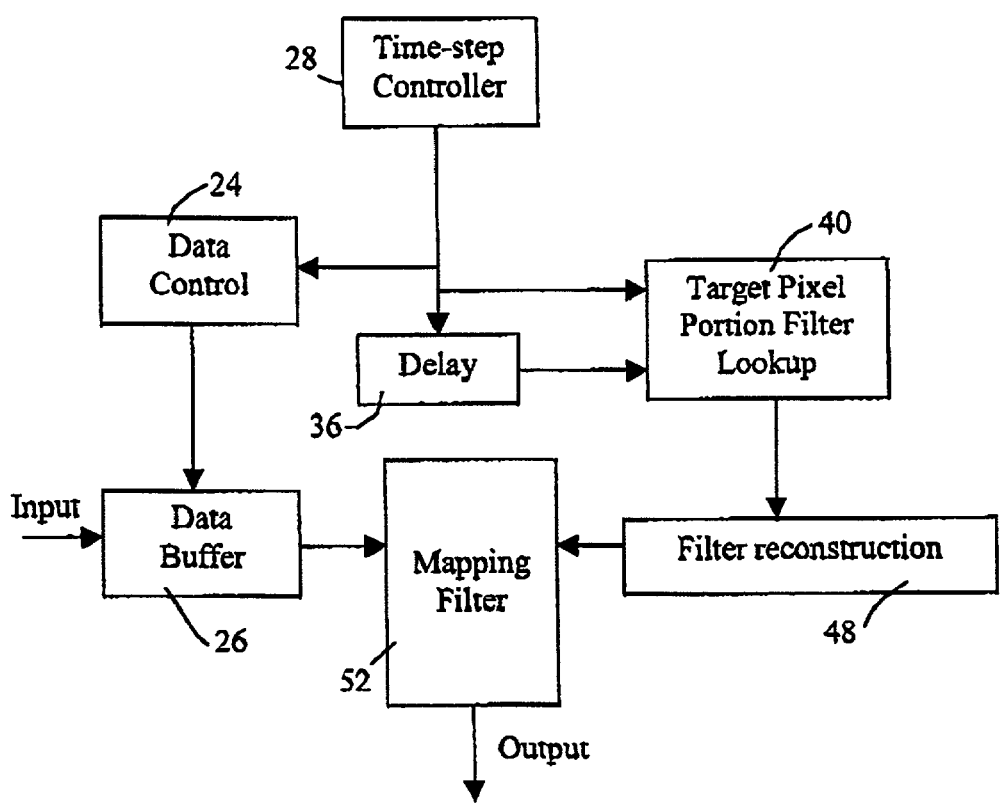
FIG. 2 is a block diagram of a system for image warping.

Referring to FIG. 2, a system for image warping is indicated generally by numeral 20. The system 20 includes a data controller 24, a data buffer 26, a time step controller 28, a delay element 36, a target pixel lookup 40, a filter reconstruction block 48, and a mapping filter 52. Input is entered to the data buffer 26, which is coupled with both the mapping filter 52 and the data controller 24. The data controller 24 is coupled to the time step controller 28, as is the target pixel lookup 40. Furthermore, target pixel lookup 40 is also coupled with the time step controller 28 via the delay element 36. The target pixel lookup 40 is coupled to the filter reconstruction block 48, which is coupled to the mapping filter 52.

The time step controller 28 measures the difference between pixels and calculates the phase values $\phi_L$ and $\phi_R$. The time step controller communicates His information to the filter lookup 40. The phase value $\phi_L$ for the left portion lookup is sent directly to the filter lookup 40, while the phase value $\phi_R$ for the right portion lookup is sent to the filter lookup 40 via the delay element 36. This reduces the circuitry required by allowing the left portion filter lookup and right portion filter lookup to share the same circuitry. Alternately, a delay is not required if separate left and right portion look up circuitry is used, as will be appreciated by a person skilled in the art.

Once the left and right filter portions have been determined, the filter reconstruction block 48 combines them for creating a complete set of filter characteristics. The filter characteristics are then provided to the mapping filter 52 for filtering the data. The data is received at the mapping filter 52 from the data buffer 26. The data flow into and out of the data buffer 26 is controlled by the data controller 24, which also receives the timing from the time step controller.

An example of the operation of the various components of the system will now be described with reference to FIG. 1, FIG. 2, and FIG. 3. It is assumed that for the present embodiment, a four-tap filter size is used. However, it will be apparent to a person skilled in the art that other filter sizes can be used, as desired. Furthermore, a plurality of filter sizes can be accommodated on either side of the target pixel.

Figure 3:
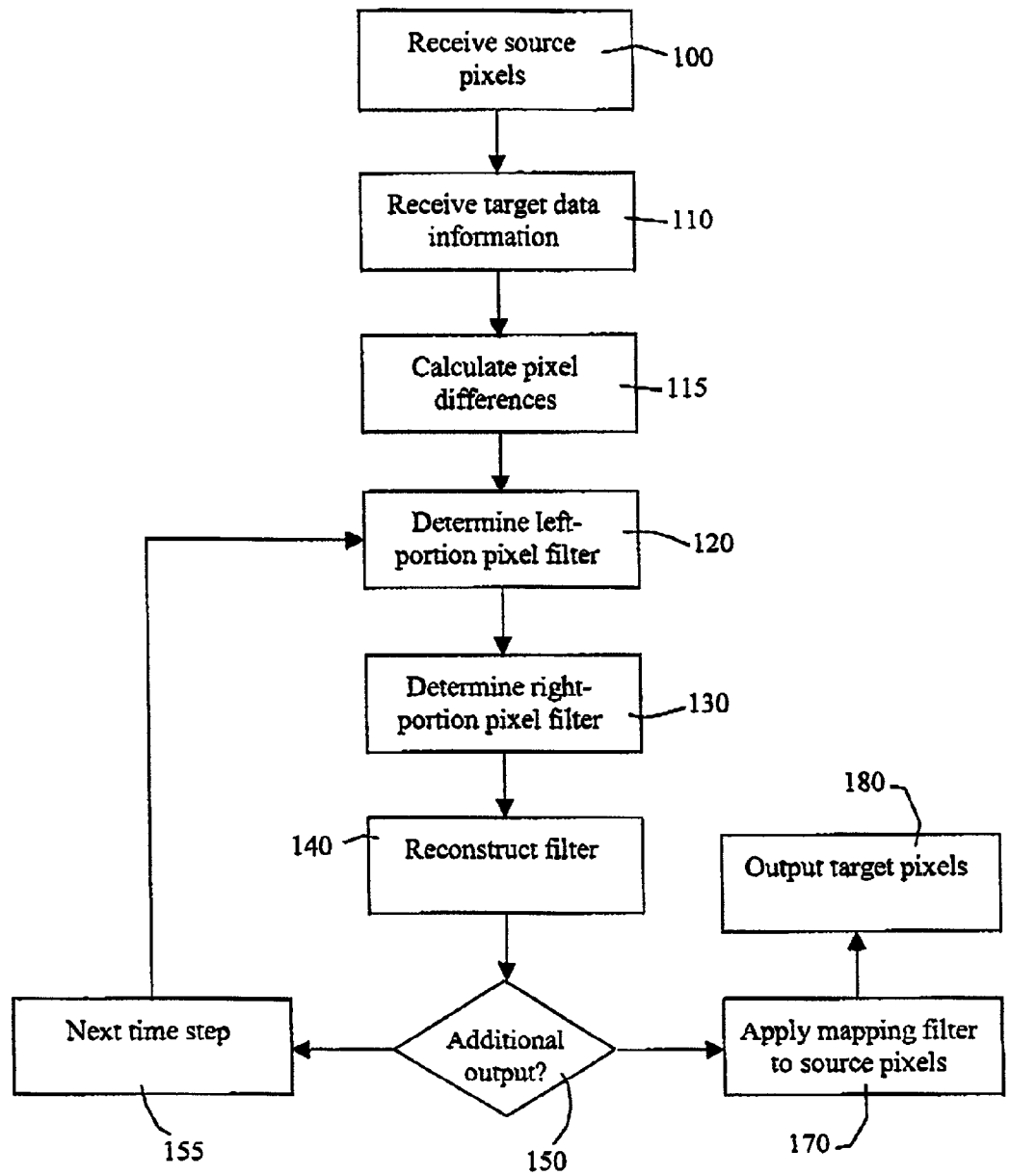
FIG. 3 is a flowchart of a method for image warping.

Referring to FIG. 3, the system receives a plurality of source pixels at step 100. At step 110, the system receives target pixel information, including the desired location of the target pixels. At step 115, the received source and target pixel information is used to calculate the distances $D_1$, $D_2$, $\phi_1$, and $\phi_2$ referred to in FIG. 1.

At step 120, the left-portion pixel filter is determined. The current iteration of the target pixel calculation is for target pixel $T_1$. The distance $D_1$ between target pixel $T_1$ and target pixel $T_0$ is used for selecting from a plurality of filters to be used for the left portion. In the present embodiment, there are two filters, Filter 1 and Filter 2, from which to select. However, it will be apparent to a person skilled in the art that a lesser or greater number of filters may be used.

The appropriate filter is selected using a threshold comparison. If the distance $D_1$ lies between a pair of predefined thresholds, then the first filter, Filter 1, is selected. If, however, $D_1$ lies between a different pair of predefined thresholds, then the second filter, Filter 2, is selected. For the present example, it is assumed that the distance $D_1$ results in the second filter, Filter 2, being selected.

The phase of the second filter is determined by the distance $\phi_L$ between the target pixel $T_1$ and the closest source pixel to its left $S_1$. The unit of measurement is the distance between source pixels so, therefore, $\phi_L$ will always be less than 1. For the present example, it is assumed that the distance $\phi_L$ is equal to 0.7.

The filter coefficients for the left portion are provided in a lookup table. An example of a filter coefficient lookup table having two possible filters and five different phases is provided below in Table 1.

TABLE 1

| Filter | Phase | Filter Coefficients | | | |
| --- | --- | --- | --- | --- | --- |
| | | $h_{-2}$ | $h_{-1}$ | $h_1$ | $h_2$ |
| 1 | 0.9 | −1 | 48 | 88 | −7 |
| | 0.7 | −2 | 58 | 78 | −6 |
| | 0.5 | −4 | 68 | 68 | −4 |
| | 0.3 | −6 | 78 | 58 | −2 |
| | 0.1 | −7 | 88 | 48 | −1 |
| 2 | 0.9 | 2 | 15 | 98 | 13 |
| | 0.7 | 8 | 31 | 69 | 20 |
| | 0.5 | 16 | 48 | 48 | 16 |
| | 0.3 | 20 | 69 | 31 | 8 |
| | 0.1 | 13 | 98 | 15 | 2 |

The filter coefficients $h_2$, $h_{-1}$, $h_1$, and $h_2$ are applied to filter taps starting from the second closest source pixel to the left of the target pixel and ending with the second closest source pixel to the right of the target pixel. Therefore, for the present example where the target pixel is $T_1$, $h_{-2}$ is applied to $S_0$, $h_{-1}$ is applied to $S_1$, $h_1$ is applied to $S_2$, and $h_2$ is applied to $S_3$.

Furthermore, it can be seen from Table 1 that the nominal sum of the filter coefficients is 128 for each phase. In the present embodiment the nominal sum is selected to be 128 and the output of the filter is divided by 128 in order to be normalized. In point of fact, filters may be designed so that the coefficients have any sum. In general a power of 2 is selected to be the nominal sum and the filter is normalized so that that the power of 2 represents a gain of 1. The output of the filter is divided by the power of 2 to be normalized.

The filter coefficients for each phase can be separated into a left portion and a right portion. The filter coefficients for the left portion are listed below in Table 2.

TABLE 2

| Filter | Phase | Filter Coefficients | | | |
|---|---|---|---|---|---|
| | | $h_{-2}'$ | $h_{-1}'$ | $h_1'$ | $h_2'$ |
| 1 | 0.9 | −1 | 48 | 17 | 0 |
| | 0.7 | −2 | 58 | 8 | 0 |
| | 0.5 | −4 | 68 | 0 | 0 |
| | 0.3 | −6 | 70 | 0 | 0 |
| | 0.1 | −7 | 71 | 0 | 0 |
| 2 | 0.9 | 2 | 15 | 47 | 0 |
| | 0.7 | 8 | 31 | 25 | 0 |
| | 0.5 | 16 | 48 | 0 | 0 |
| | 0.3 | 20 | 43 | 0 | 0 |
| | 0.1 | 13 | 51 | 0 | 0 |

Note that the nominal sum of the left portion filter coefficients are 64, half of that for the overall filter. The left portion filter coefficients are calculated as follows:

$h_{-2}' = h_{-2}$ $h_2' = 0$ $\text{temp} = \frac{1}{2} - (h_{-2} + h_{-1})$

If temp>0

$h_{-1}' = h_{-1}$ $h_1' = \text{temp}$ else $h_{-1}' = \frac{1}{2} h_{-2}$ $h_1' = 0$ where ½=half the nominal sum=½(128)=64, for the present example.

Since the distance $\phi_L$ is 0.7, the left portion coefficients are {8, 31, 25, 0}. The contribution to the left portion from the source pixels $S_0$ and $S_1$ on the left side of the target pixel $T_1$ is {8, 31}. Since the sum of their contribution is equal to 39, which is less than 64, an adjustment from the closest source pixel S2 to the right of the target pixel T1 is required. The value of the contribution from source pixel S2 is {25}, which compensates the difference. Generally, the compensation $C_R$ required from source pixel S2 is:

$C_R = 64 - (h_{-2} + h_{-1})$

Once the left portion filter coefficients are determined, step 120 is complete. At step 130, similar steps are taken to calculate the right portion filter coefficients. For the right portion, the distance $D_2$ between target pixel $T_1$ and target pixel $T_2$ is used for selecting from the two filters, Filter 1 and Filter 2.

Similar to the left portion, the appropriate filter is selected using a threshold comparison, If the distance $D_2$ lies between a pair of predefined thresholds, then the first filter, Filter 1, is selected. If, however, $D_2$ lies between a different pair of predefined thresholds, then the second filter, Filter 2, is selected. For the present example, it is assumed that the distance $D_2$ results in the first filter, Filter 1, being selected.

The phase of the first filter is also determined by the distance $\phi_L$ between the target pixel $T_1$ and the closest source pixel to its left $S_1$. Therefore, the distance $\phi_L$ is equal to 0.7.

The filter coefficients for the right portion of the filter are listed below in Table 3.

TABLE 3

| Filter | Phase ($\phi_L$) | Filter Coefficients | | | |
|---|---|---|---|---|---|
| | | $h_{-2}''$ | $h_{-1}''$ | $h_1''$ | $h_2''$ |
| 1 | 0.9 | 0 | 0 | 71 | −7 |
| | 0.7 | 0 | 0 | 70 | −6 |
| | 0.5 | 0 | 0 | 68 | −4 |
| | 0.3 | 0 | 8 | 58 | −2 |
| | 0.1 | 0 | 17 | 48 | −1 |
| 2 | 0.9 | 0 | 0 | 51 | 13 |
| | 0.7 | 0 | 0 | 43 | 20 |
| | 0.5 | 0 | 0 | 48 | 16 |
| | 0.3 | 0 | 25 | 31 | 8 |
| | 0.1 | 0 | 47 | 15 | 2 |

It can be seen from Table 3 that the nominal sum of the right portion filter coefficients is 64 for each phase. The right portion filter coefficients are calculated as follows:

$h_2'' = h_2$ $h_{-2}'' = 0$ $\text{temp} = \frac{1}{2} - (h_2 + h_1)$

If temp>0

$h_1'' = h_1$ $h_{-1}'' = \text{temp}$ else $h_1'' = \frac{1}{2} - h_{-2}$ $h_{-1}'' = 0$ Since the distance $\Phi_L$ is 0.7, the right portion coefficients are {0, 0, 70, −6}. The contribution to the right portion from the source pixels $S_2$ and $S_3$ on the right side of the target pixel $T_1$ is {70, −6}. Since the sum of their contribution is equal to 64, an adjustment from the closest source pixel $S_1$ to the left of the target pixel $T_1$ is not required. Generally, however, the compensation $C_L$ required from source pixel $S_1$ is:

$C_L = 64 - (h_2 + h_1)$

Note that the table has been constructed such that the phase is determined by the distance $\phi_L$. However, since $\phi_L = 1 - \phi_R$, it is also possible to determine The phase of the filter for the right portion by examining the distance $\phi_R$.

Once the right portion filter coefficients are determined, step 130 is complete and an overall target pixel filter is reconstructed at step 140. The filter reconstruction combines the selected left portion coefficients and right portion coefficients by addition Therefore, the resulting constructed filter is {8, 31, 95, −6}. The sum of the reconstructed filter coefficients is 128.

At step 150, the time step control determines whether or not more target pixels need to be created. In the present example, there is yet another target pixel $T_2$ to be created. Therefore, the process returns to step 120 and the left portion filter coefficients for $T_2$ are determined. The distance $D_2$ between $T_2$ and $T_1$ is used for determining which filter to select for the left portion filter coefficients. Therefore, the same filter, Filter 2, is selected for the left portion filter coefficients for target pixel $T_2$ as was selected for the right portion filter coefficients for target pixel $T_1$. However, the phase is different, since the distance between target pixel $T_2$, and source pixel $S_3$ is different from that between target pixel $T_1$ and source pixel $S_1$. For the target pixel $T_2$, the phase is calculated to be 0.1. Therefore, from Table 2, the left portion coefficients are {13, 51, 0, 0}.

At step 130, the right portion filter coefficients for $T_2$ are determined. A distance $D_3$ between target pixel $T_2$ and target pixel $T_3$ is used for determining which of the two filters to use for the right portion filter coefficients. Using the predefined thresholds, it is determined that the first filter, Filter 1 is to be used. From Table 3, the right portion coefficients are {0, 17, 48, −1}.

At step 140, filter coefficients are reconstructed by addition of the left portion filter coefficients and the right portion filter coefficients. Therefore, the reconstructed filter coefficients are {13, 68, 48, −1}.

In the present embodiment, filters having an even number (four) of taps were illustrated However, it is possible to implement the invention using filters have an odd number of taps. In an alternate embodiment, five-tap filters are used instead of the four-tap filters described in the previous embodiment. The general process is similar to the previous embodiment, the main difference being the separation of the overall filter coefficients into left portion and right portion coefficients.

| Table 4 is an example of a five-tap filter, and its corresponding adjusted coefficients. | | | | | |
| --- | --- | --- | --- | --- | --- |
| | $h_{-2}$ | $h_{-1}$ | $h_0$ | $h_1$ | $h_2$ |
| Original 5-tap filter | 20 | −10 | 98 | −20 | 40 |
| Adjusted filter portions | $h_{-2}$ | $h_{-1}$ | $hL_0$ | $hR_0$ | $h_1$ | $h_2$ |
| Left portion | 20 | −10 | 54 | 0 | 0 | 0 |
| Right portion | 0 | 0 | 0 | 44 | −20 | 40 |

The center of the five taps, $h_0$ is separated into a left center tap $hL_0$ and a right center tap $hR_0$. The left portion of the filter is determined by preserving the filter coefficients for the filter taps left of the centermost tap. The sum of the left portion of the filter coefficients is given by $LP=h_{-2}+h_{-1}+½h_0$. The left center tap is calculated as $hL_0=½+½h_0-LP$. A similar procedure is followed for the right center tap, where $RP=h_2+h_1+½h_0$ and $hR_0=½+½h_0-RP$.

When the filter tap coefficients are reconstructed, $hL_0$ of the selected left portion coefficients is added to $hR_0$ of the selected right portion coefficients for reconstructing the center coefficient $h_0$.

Furthermore, it is common in resampling systems to use filters of different lengths for different bandwidths. For example, a half band filter with four taps could be used for reducing the number of samples by a factor of two. Similarly, a quarter band filter with eight taps could be used for reducing the number of samples by a factor of four.

It will be apparent to a person skilled in the art how to apply the invention to filters of differing lengths for the left and right portions. For example, a six-tap filter is used for the left portion and a four-tap filter is used for the right portion. The resulting filter is a five-tap filter ($h_3$, $h_{-2}$, $h_{-1}$, $h_1$, $h_2$).

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privelege is claimed are defined as follows:

1. A system for generating a target pixel in a target grid from a plurality of non-upsampled source pixels in a non-upsampled source grid, comprising:

(a) a filter controller to calculate a first difference between a target pixel in the target grid and a non-upsampled source pixel in the non-upsampled source grid to the left of said target pixel, and to calculate a second difference between said target pixel in the target grid and a non-upsampled source pixel in the non-upsampled source grid to the right of said target pixel;

(b) a left portion lookup circuit to select filter coefficients for a left portion of said target pixel in accordance with said first difference;

(c) a right portion lookup circuit to select filter coefficients for a right portion of said target pixel in accordance with said second difference; and (d) a filter reconstruction unit to create a filter with said left and right portion filter coefficients, said filter for generating said target pixel from said plurality of non-upsampled source pixels.

2. A system as defined in claim 1, wherein said left portion lookup circuit and said right portion lookup circuit share a common lookup circuit, wherein input to said common circuit is offset by a predetermined delay.

3. A method for generating a target pixel in a target grid from a plurality of non-upsampled source pixels in a non-upsampled source grid, said method comprising:

(a) receiving the plurality of non-upsampled source pixels in the non-upsampled source grid;

(b) determining a first difference between said target pixel and a non-upsampled source pixel to the left of said target pixel, and a second difference between said target pixel and a non-upsampled source pixel to the right of said target pixel after receiving;

(c) selecting a first set of filter coefficients for a left portion of said target pixel in accordance with said first difference;

(d) selecting a second set filter coefficients for a right portion of said target pixel in accordance with said second difference;

(e) combining said first and second sets of coefficients for creating a final filter for said target pixel; and (f) using said final filter for generating said target pixel.

4. A method as defined in claim 3, wherein said first and second differences are horizontal differences when said non-upsampled source pixels are processed horizontally and vertical differences when said pixels are processed vertically.

5. A method as defined in claim 3, wherein each of said first and second sets of coefficients are selected from a plurality of sets of coefficients in accordance with said first and second differences.

6. A method as defined in claim 5, wherein each of said first and second sets of coefficients are selected by determining which of a plurality of ranges said first and second differences are included, and selecting a corresponding filter from a plurality of filters.

7. A method as defined in claim 6, wherein said plurality of filters are decomposed into left portion coefficients and right portion coefficients, said left portion coefficients for associating with said corresponding first set of coefficients and said right portion coefficients for associating with said corresponding second set of coefficients.

8. A method as defined in claim 7, wherein said left and right portion coefficients each have a sum of half a nominal value of said filter.

9. A system, comprising:
- a data buffer to receive a plurality of non-upsampled source pixels in a non-upsampled source grid;
- a filter controller to calculate a first difference between a target pixel in a target grid and a non-upsampled source pixel to the left of the target pixel and to calculate a second difference between the target pixel in the target grid and a non-upsampled source pixel to the right of the target pixel, where the non-upsampled source pixels received by the data buffer;
- a lookup circuit to select right and left portion filter coefficients in accordance with the first and second differences;
- a filter reconstruction unit to reconstruct a filter responsive to right and left portion filter coefficients;
- where the filter generates the target pixel responsive to the filter.

10. The system of claim 9 comprising a data controller to control the data buffer.

11. The system of claim 9 comprising a delay interposed between the filter controller and the lookup circuit to delay the selection of one of the right and left portion filter coefficients.

12. A method of image warping, comprising:
- receiving a plurality of non-upsampled source pixels;
- calculating first and second differences between a target pixel and a non-upsampled source pixel to the left of the target pixel and a non-upsampled source pixel to the right of the target pixel, respectively, after receiving;
- determining left portion filter coefficients responsive to the calculating the first difference;
- determining right portion filter coefficients responsive to the calculating the second difference;
- reconstructing a filter responsive to the determining left and right portion filter coefficients; and
- generating the target pixel from the plurality of non-upsampled source pixels responsive to the reconstructing.

* * * * *